W. M. WHITE.
APPARATUS FOR INCREASING HEAD.
APPLICATION FILED JUNE 19, 1913.
1,273,704.
Patented July 23, 1918.
3 SHEETS—SHEET 2.
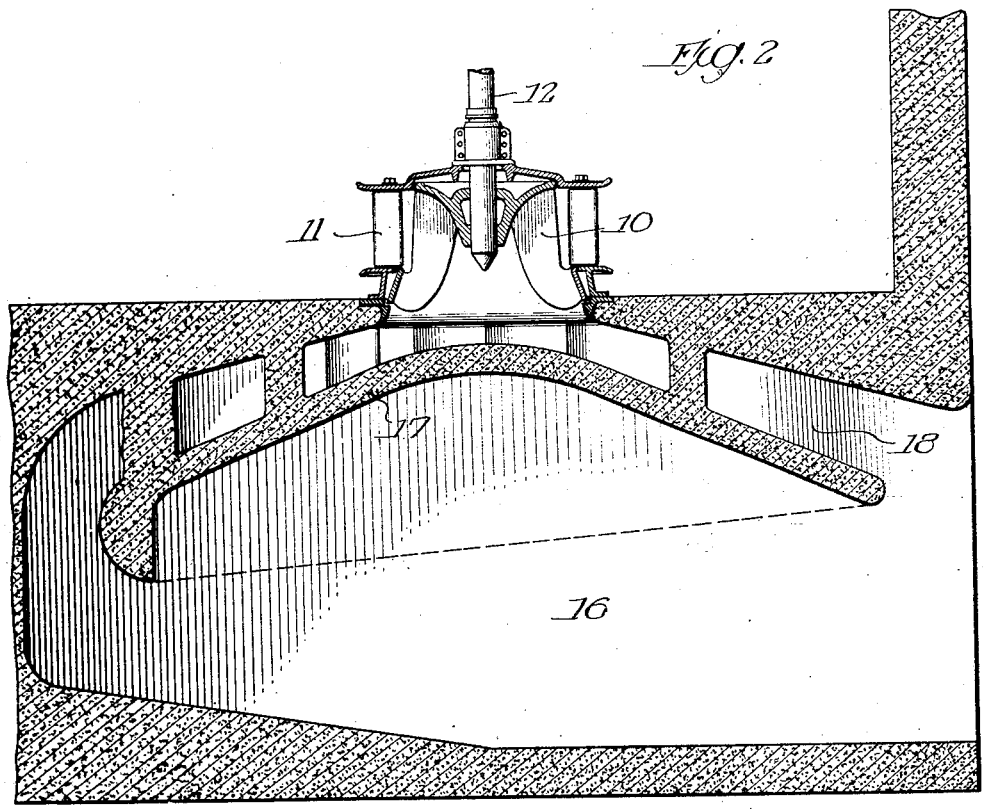
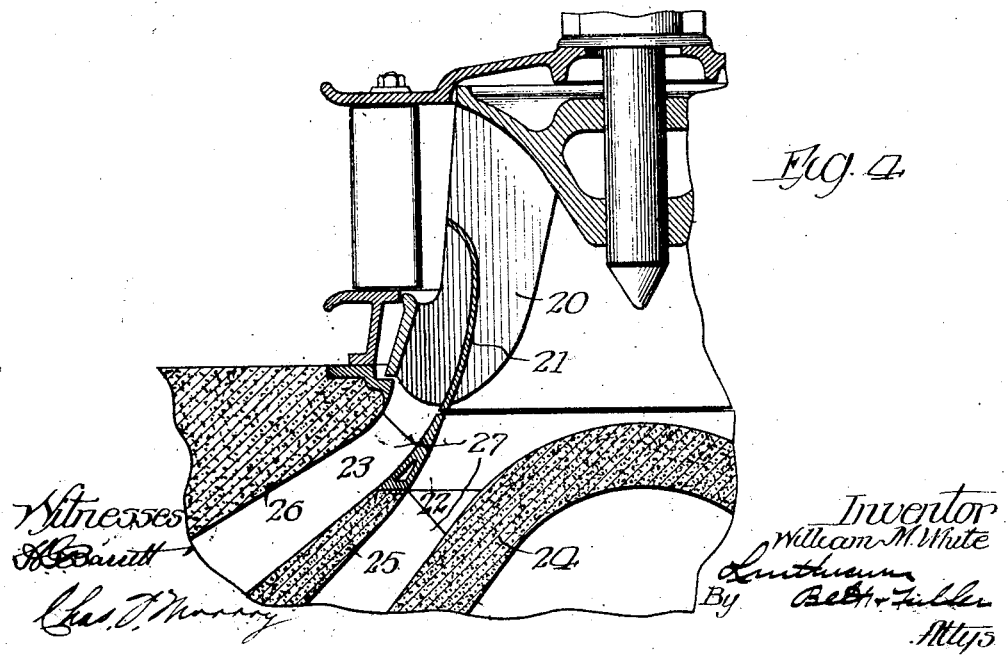

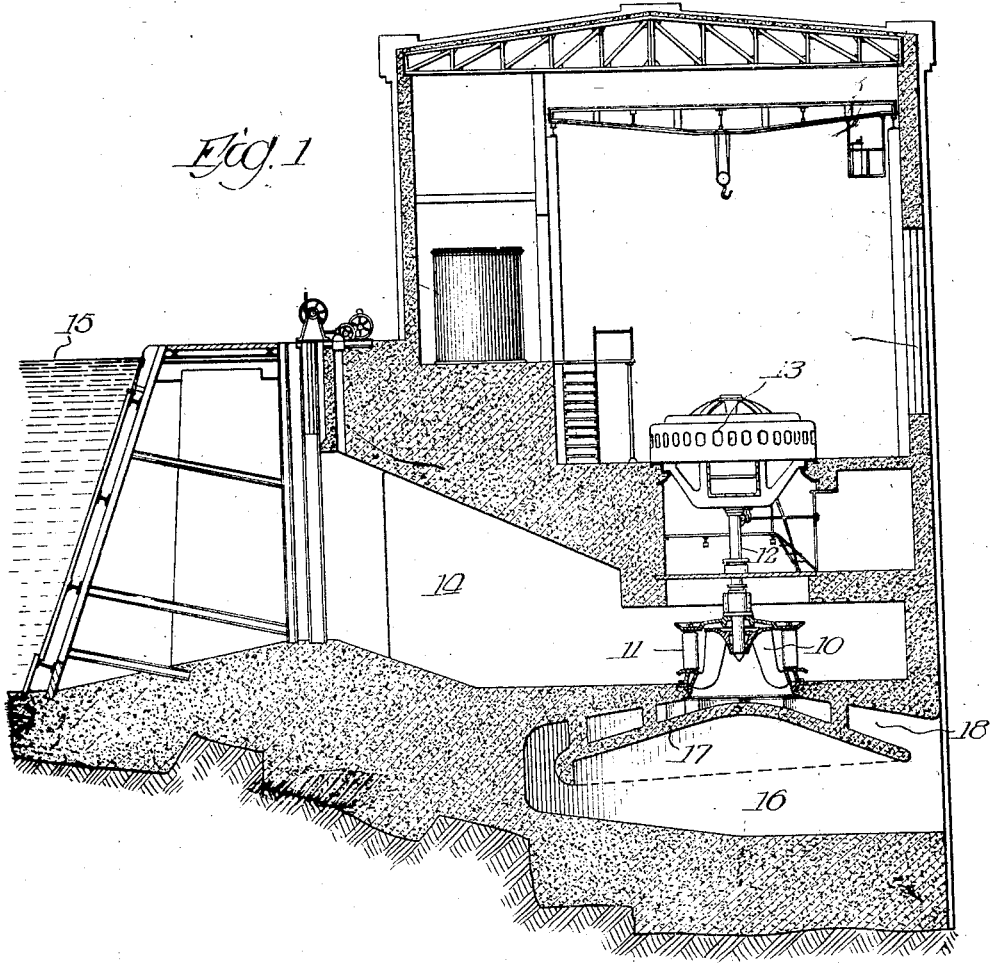

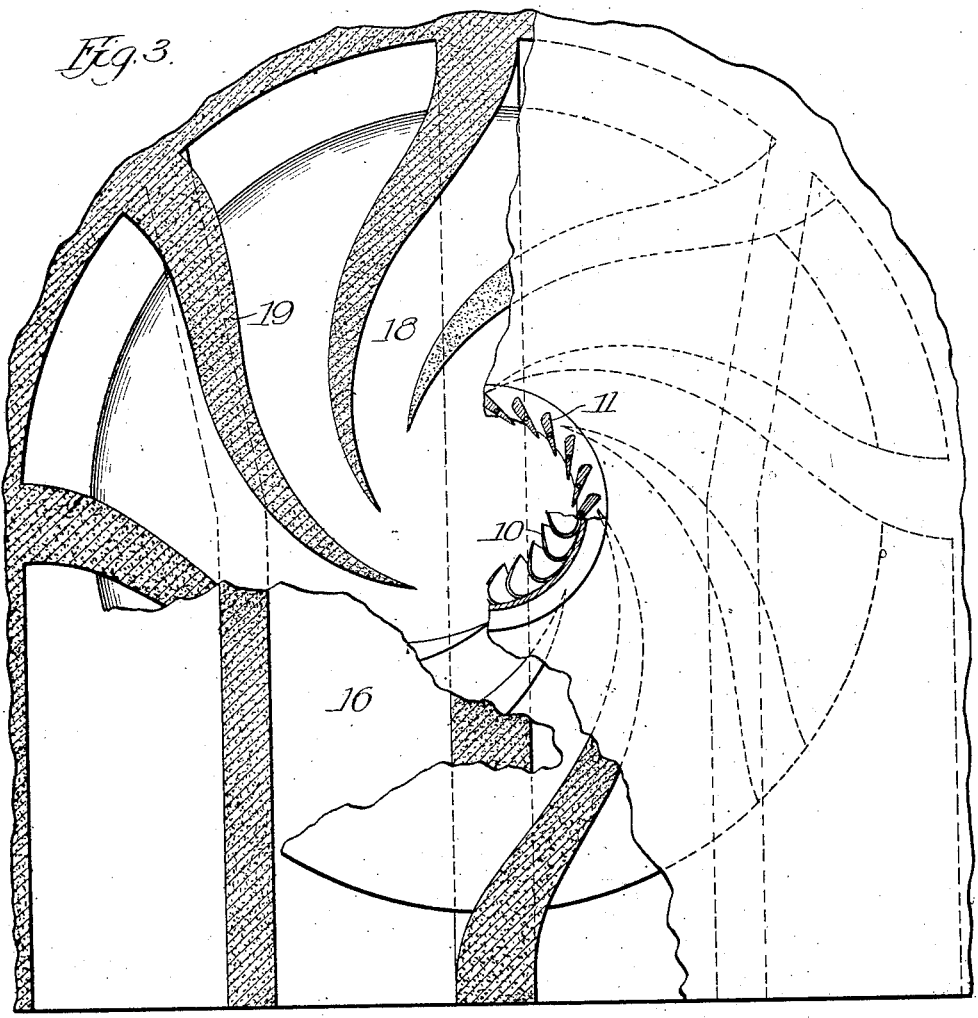
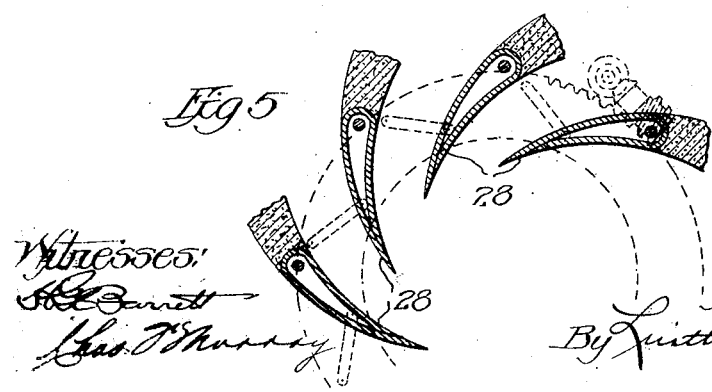

UNITED STATES PATENT OFFICE.

WILLIAM M. WHITE, OF MILWAUKEE, WISCONSIN.

APPARATUS FOR INCREASING HEAD.

1,273,704. Specification of Letters Patent. Patented July 23, 1918.

Application filed June 19, 1913. Serial No. 774,527.

*To all whom it may concern:*

Be it known that I, WILLIAM M. WHITE, a citizen of the United States, residing at Milwaukee, in the county of Milwaukee and State of Wisconsin, have invented certain new and useful Improvements in Apparatus for Increasing Head, of which the following is a specification.

This invention relates to head increasers for installation in water power plants. The object of the device is to increase the head on the water wheel.

The construction herein shown is a modification of the structure shown in my co-pending applications Serial Nos. 769,790 and 769,791, filed May 26, 1913. These applications show and claim structures of various forms by means of which the velocity of water discharged from the water wheel may be changed into pressure head with the greatest efficiency.

Likewise in my co-pending application Serial No. 774,528, filed June 19, 1913, I have disclosed and claimed a method of operating water power plants, which method may be carried out by the use of apparatus such as described in this and the before mentioned applications.

The head increaser is for the purpose of regaining pressure energy from the velocity energy of the water discharged with excess whirling motion from the runner of a water wheel to increase the head acting on the wheel. The increased head acting on the wheel is useful in producing a greater power and greater speed. The device consists of a multiplicity of outwardly extending passages of increasing capacity in the direction of flow, the smaller ends of said passages being disposed around the periphery of the discharge end of the runner forming an outwardly extending annular outlet for the water discharged from the runner, said outwardly extending passages disposed at an angle to the line of motion of the runner, which angle is substantially less than a right angle. The passages are disposed at an angle to the line of motion of the runner to discharge the water tangentially therefrom with a radial component.

Before proceeding to the drawings and a detailed description thereto reference will first be made to the action of the regain of pressure from velocity, upon which the results to be accomplished by the device largely depend. The regain of pressure from velocity is in general accordance with Bernouilli's law, which is stated in "*Treatise on Hydraulics*" by Merriman, edition 1903, page 76, as follows:

"At any section of a tube or pipe under steady flow without friction the pressure head plus the velocity head is equal to the hydro-static head that obtains when there is no flow".

A description and results of some experiments relating to the regain of pressure from velocity of water in motion in regaining conduits of increasing capacity in the direction of flow are given on pages 186, 187 and 188 of the above reference, in which at the top of page 188, there is a statement to the effect that the flow through the regaining section was that due to a head of over five times the actual head. Computations from the results of the test described show that the device converted velocity energy into pressure energy with an efficiency of 84%. Experiments which I have made on similar devices give results comparable to this.

The present invention contemplates the use of a plurality of these regaining sections for receiving the water whirling from the water wheel running at high speed.

The difference of pressure between the smaller ends and the discharge ends of the said passages will depend upon the amount of velocity energy discharged into the smaller ends of said passages from the runner. When the runner is operating at excess speed the water is discharged therefrom with whirling motion into the smaller ends of said passages. By so relating the water passages of the runner and its speed, any desired proportion of the energy due to the fall may be discharged into the smaller ends of said passages of increasing capacity in the direction of flow. By regulating the amount of the energy discharged from the runner the difference between the pressure at the smaller ends and the discharge ends of said passages may be made a portion of or equal to or greater than the fall under which the power plant is operating.

The action on the head increaser may be more readily described by the use of an example. Let us assume that the water wheel be operating at such excess speed in connection with the regaining passages referred to, as to cause 150% of the energy, which that quantity of water which would flow under an unmodified head equal to the fall would have to be delivered to the smaller ends of the said passages, and let us assume that the area of the discharge ends of the said passages is such that the velocity therethrough contains only 3% of the energy due to the fall thus leaving 147% of the energy which that quantity of water which would flow under an unmodified head due to the fall would have to be converted from the velocity into pressure within said passages.

On the basis of an efficiency of conversion of 80% for the said passages the pressure at the smaller ends of said passages will be .8 of 147% or 117.5% of the pressure due to the fall less than the pressure at the discharge ends of the passages, but the discharge ends of said passages communicate with the tailrace to the surface of which the fall is measured so that the head acting on the water wheel to cause flow through it is 2.175 times the fall.

When the efficiency of conversion is 80% the energy lost is, consequently, 20% of the energy entering the smaller ends of said passages minus the energy discharged from said passages or .20 times 147 or 29.4% of the energy due to the fall is wasted in maintaining a head on the water wheel of 2.175 times the fall.

The increased head acting on the water wheel and the operation of the wheel at excess speed from what it would have been normally for that increased head is useful in maintaining a greater speed for given conditions of power and fall than has heretofore been obtained.

In this specification the term fall is taken to mean the difference in elevation between the surface of the water above the dam and the surface of the water below the dam of the power plant under discussion.

It may be found desirable in some instances to make the inner ends of the guide vanes adjustable so as to adjust them to the angle of flow from the runner.

When there is whirl in the water from the runner, that portion at the outer edge is moving at higher velocity and greater kinetic energy than that near the center and I may prefer to divide the head increaser into passages to accommodate different velocities and avoid combining these different velocities which would result in loss of energy by shock. In this manner I will obtain still greater efficiency in the head increaser. This is indicated in Fig. 4.

My invention will be more readily understood by reference to the accompanying drawings, wherein, Figure 1 is a transverse section through a power house;

Fig. 2 is a transverse, vertical section of my novel head increaser.
Fig. 3 is a plan view with portions broken away to show the construction of the guide vanes, the runner vanes and the vanes at the top of the head increaser;

Fig. 4 is an enlarged fragmentary view showing a modification of the preceding constructions, and, Fig. 5 is a plan section showing a modified form of vanes.

Referring more particularly to the drawings it will be seen that in Fig. 1, I have shown a water wheel 10, guide vanes 11, controlling the entrance of water to the wheel. Power is taken from the wheel by means of shaft 12, connected to a generator 13. The water is supplied to the wheel through a conduit 14, the head water being indicated at 15. Located beneath the water wheel within the space 16, is my novel conical head increaser 17, supported by suitable piers. The cone is located in such manner that a space 18, is provided there-above, which space is of progressively increasing height from the center to the outer edge of the cone. While this is a desirable feature it is not essential inasmuch as the space might be of constant height throughout the diameter of the cone. Upon the upper surface of the cone and extending from the pit floor to the top of the cone are vanes 19, each thereof being reversely curved and extending from the periphery of the water wheel runner to the outer edge of the cone. The vanes may be as shown, narrow at their inner ends and wider at their outer ends or they may be of uniform thickness. I propose to utilize the otherwise wasted energy in the water discharged from the runner by transforming the velocity of the water into pressure, whereby a much higher head is secured. This higher head in turn causes the operation of the water wheel at a much higher speed.

In Fig. 4 the modification shown is in the provision of an additional space within which the water may expand. The water wheel 20, is provided between the vanes with webs 21, whereby water is divided and directed into two concentric spaces 22, 23, formed by the cone 24 and intervening wall 25, and a top wall 26, which wall is formed from the pit floor. In this construction deflecting vanes 27, corresponding to the vanes 19, in Fig. 3, may or may not be included as desired. The water passing toward the center of the wheel will have less whirl than that at the outer edge, the water having a greater whirl passing into the space 23 where it is permitted to expand in the progressively increasing space.

In the construction of Fig. 5 I have shown the inner ends 28, of the guide vanes as adjustable whereby the angularity of the vanes may be changed to correspond to the flow of water from the runner. This may be found desirable in some instances.

It will be understood that the construction herein shown is capable of other modifications, and such modifications as are within the scope of my claims I consider within the spirit of my invention.

By water wheel under the present specification and claims, I mean a water wheel, hydraulic turbine or any hydraulic power producing apparatus having a runner of such form as to cause the water to be discharged from it preferably axially to the rotation of the runner, and I mean especially any hydraulic power apparatus which may be used with my invention for the accomplishment of the results claimed. One type of a water wheel in the meaning of the specification and claims is illustrated in the drawings.

I claim:

1. In water power apparatus, the combination of a water wheel provided with a water discharge passage, a wall disposed in said passage, said wall forming a plurality of passages of increasing volume from the runner outward, said passages being arranged at an angle to the line of motion of the runner in a plane at right angles to the axis of rotation of the runner which angle is materially less than a right angle, substantially as described.

2. In a water power apparatus, the combination of a water wheel provided with a discharge passage therebeneath, said passage having a component radial to the axis of the turbine, and angular deflectors located in said passage and adapted to intercept and direct the discharged water in a direction which has a component tangential to the runner, substantially as described.

3. In a water power apparatus, the combination of a water wheel and a discharge passage therebeneath, said passage being disposed with a component radial to the axis of rotation of the runner, and deflectors dividing said passage into a plurality of passages, the passages so formed being curved with relation to a radial line from the axis of said water wheel and adapted to receive water discharged from the water wheel with tangential force and permit the expansion of said water along lines of least resistance.

4. In water power apparatus, the combination of a water wheel, a substantially conical wall disposed in a space at the discharge end of said water wheel, and deflectors on said wall, said deflectors forming tangential passages from the water wheel outward whereby water may be discharged from the water wheel into said passages with slight change in direction, substantially as described.

5. In water power apparatus, the combination of a water wheel, a substantially conical wall disposed in a space at the discharge end of said water wheel, and deflectors on said wall, said deflectors forming tangential passages from the water wheel outward whereby water may be discharged from the water wheel when operated at excess speed into said passages with slight change in direction, substantially as described.

6. In water power apparatus, a water wheel, and walls located at the discharge of the water wheel and providing multiple passages located substantially tangentially about the periphery of the water wheel whereby water discharged tangentially from the water wheel may enter the passages without material change in direction, said passages increasing in capacity from the water wheel outward to the end that the velocity of the water is changed into pressure, substantially as described.

7. In water power apparatus, a water wheel, and walls located at the discharge of the water wheel and providing a plurality of curved passages located substantially tangentially about the periphery of the water wheel whereby water discharged tangentially from the water wheel may enter the passages without material change in direction, said passages increasing in capacity from the water wheel outward to the end that the velocity of the water is changed into pressure, substantially as described.

8. In combination with a water wheel runner having a concentric web dividing the vanes thereof into separate wheel sections, of conical surfaces forming passages therebetween, said passages registering with the sections of the runner, and deflectors located in said passages, said deflectors having their ends next to the runner set tangentially to the runner periphery, whereby water thrown tangentially from the water wheel runner is received without material change in direction, and different velocities from the different sections of the runner may be transformed into pressure in separate passages with greatest effectiveness, substantially as described.

9. In combination with a water wheel runner, adjustable vanes located at the discharge of said runner, and means for adjusting said vanes to conform to the line of motion of water discharged from the runner, said vanes forming and connecting with expanding passages, whereby water discharged from the runner with whirling motion may flow into said passages without material change of direction, substantially as described.

10. The combination with an axial discharge water wheel, of an annular passage disposed at the discharge side of the wheel, around the axis thereof, at substantially right angles to said axis and of materially greater diameter than the wheel, whereby the whirling discharge water is permitted to follow the direction of its natural tendency, which is outward from the center of rotation, said annular passage having vanes therein disposed at an angle to the line of motion of the runner of the wheel, which angle is materially less than a right angle.

11. The method of increasing the effective head of water for utilization in water wheels, consisting in discharging the water from the water wheel runner with a large tangential component into passages of increasing area, said passages being set at an angle to the line of motion of the runner and thereby changing the kinetic energy in the water which leaves the runner into potential energy at the end of the passages to increase the effective head on the water wheel, substantially as described.

12. The method of increasing the effective head of water on a water wheel, consisting in operating the wheel at such a speed that there is delivered to the wheel shaft a portion only of the energy of the water which would be delivered by running the wheel at a different speed, and utilizing the remaining energy in expanding passages located at an angle to the line of motion of the runner in producing a greater effective head on the wheel, substantially as described.

13. The method of operating a water wheel, consisting in running the wheel at a speed in excess of that at which the wheel should be run to give its maximum efficiency at the head of water acting thereon and delivering to the shaft of said wheel only a portion of the energy of the water which would be delivered thereto by running the wheel at the speed of said maximum efficiency, and utilizing the remaining energy in the water passing through the wheel in expanding passages disposed at an angle to the rotation of the runner, to produce in part the effective head of water acting on the wheel, substantially as described.

14. The method of operating a water wheel, consisting in running said wheel at a speed in excess of that at which the wheel should be run to give its maximum efficiency at the head of water acting thereon, and due to such an excess in speed delivering to the shaft of said wheel only a portion of the energy of the water which would be delivered thereto by running the wheel at the speed of said maximum efficiency, and utilizing the remaining energy of the water after passing through the wheel in a multiplicity of concentric passages having a radial component to the axis of the runner, to produce in part the effective head of water acting on the wheel, substantially as described.

15. The method of operating a water wheel, consisting in running said wheel at a speed in excess of that at which the wheel should be run to give its maximum efficiency at the head of water acting thereon, and due to such excess in speed delivering to said water wheel only a portion of the energy of the water which would be delivered thereto by running the wheel at the speed of said maximum efficiency, and converting the remaining kinetic energy in the water after passing through the wheel into potential energy in expanding passages having a component tangential to the periphery of the runner to produce in part the effective head of water acting on the wheel, substantially as described.

16. The method of operating a water wheel which consists of running said wheel at excessive speed and delivering to the water wheel shaft only a portion of the energy of the water which might be delivered by running at a lower or normal speed, then utilizing the remaining energy in the water in expanding passages set at an angle to the line of motion of the runner in producing a greater effective head on the water wheel, substantially as described.

WILLIAM M. WHITE.

Witnesses:
CHAS. F. MURRAY,
T. D. BUTLER.